(12) United States Patent
Salonen

(10) Patent No.: US 11,393,006 B2
(45) Date of Patent: *Jul. 19, 2022

(54) PRODUCT/SERVICE RESERVATION AND DELIVERY FACILITATION WITH SEMANTIC ANALYSIS ENABLED DIALOG ASSISTANCE

(71) Applicant: BOOKIT OY, Helsinki (FI)

(72) Inventor: Jukka Kalevi Salonen, Colleyvile, TX (US)

(73) Assignee: SMARTCOM LABS OY

( * ) Notice: Subject to any disclaimer, the term of this patent is extended or adjusted under 35 U.S.C. 154(b) by 0 days.

This patent is subject to a terminal disclaimer.

(21) Appl. No.: 17/150,738

(22) Filed: Jan. 15, 2021

(65) Prior Publication Data

US 2021/0312514 A1 Oct. 7, 2021

Related U.S. Application Data

(63) Continuation of application No. 14/640,206, filed on Mar. 6, 2015, now Pat. No. 10,902,491, which is a
(Continued)

(30) Foreign Application Priority Data

Aug. 21, 2001 (FI) ..................... 20011680

(51) Int. Cl.
*G06Q 10/02* (2012.01)
*G06Q 30/06* (2012.01)
(Continued)

(52) U.S. Cl.
CPC ......... *G06Q 30/0619* (2013.01); *G06Q 10/02* (2013.01); *G06Q 10/025* (2013.01);
(Continued)

(58) Field of Classification Search
None
See application file for complete search history.

(56) References Cited

U.S. PATENT DOCUMENTS 5,323,321 A 6/1994 Smith, Jr.
5,592,666 A 1/1997 Perez
(Continued)

FOREIGN PATENT DOCUMENTS

CN 1675637 A 9/2005
EP 0881802 A1 2/1998
(Continued)

OTHER PUBLICATIONS

Omd wireless AG; Wirelss Application Messaging Serivce; Unknown 2004.
(Continued)

*Primary Examiner* — Fateh M Obaid
(74) *Attorney, Agent, or Firm* — Barnes & Thornburg LLP

(57) ABSTRACT

A method and system capable of authenticating transactions involving at least one service provider and one or more users who are each in electronic communication. This electronic communication can be, for example, SMS, MMS, e-mail, or online account messaging. It is an aspect of certain embodiments where the transaction is an authentication and/or verification of an entity. Examples of such entities are products, actions, and users.

31 Claims, 10 Drawing Sheets

Related U.S. Application Data continuation-in-part of application No. 13/897,785, filed on May 20, 2013, now Pat. No. 11,004,014, which is a continuation of application No. 12/972,610, filed on Dec. 20, 2010, now Pat. No. 9,177,268, application No. 17/150,738, which is a continuation-in-part of application No. 12/401,392, filed on Mar. 10, 2009, now Pat. No. 9,937,531, said application No. 12/972,610 is a continuation of application No. 11/980,470, filed on Oct. 31, 2007, now Pat. No. 8,050,664, which is a continuation of application No. 10/227,194, filed on Aug. 21, 2002, now Pat. No. 7,406,429.

(51) Int. Cl.

| | |
|---|---|
| *G06Q 10/08* | (2012.01) |
| *H04W 4/024* | (2018.01) |
| *G06Q 10/10* | (2012.01) |
| *H04W 12/06* | (2021.01) |
| *H04W 4/12* | (2009.01) |
| *G06Q 20/40* | (2012.01) |
| *H04M 3/42* | (2006.01) |
| *G07F 17/12* | (2006.01) |
| *G06Q 20/32* | (2012.01) |
| *G08G 1/00* | (2006.01) |
| *H04L 12/18* | (2006.01) |

(52) U.S. Cl.
CPC ..... *G06Q 10/08355* (2013.01); *G06Q 10/109* (2013.01); *G06Q 20/40* (2013.01); *G06Q 30/0601* (2013.01); *G06Q 30/0641* (2013.01); *G07F 17/13* (2020.05); *H04M 3/42382* (2013.01); *H04W 4/024* (2018.02); *H04W 4/12* (2013.01); *H04W 12/06* (2013.01); *G06Q 20/322* (2013.01); *G08G 1/207* (2013.01); *H04L 12/1886* (2013.01)

(56) References Cited

U.S. PATENT DOCUMENTS

| | | | |
|---|---|---|---|
| 5,752,191 A * | 5/1998 | Fuller | H04Q 3/54 455/445 |
| 5,838,965 A | 11/1998 | Kavanagh et al. | |
| 5,940,818 A | 8/1999 | Malloy et al. | |
| 5,987,467 A | 11/1999 | Ross et al. | |
| 6,003,036 A | 12/1999 | Martin | |
| 6,047,270 A | 4/2000 | Joao et al. | |
| 6,085,100 A | 7/2000 | Tarnanen | |
| 6,104,870 A | 8/2000 | Frick et al. | |
| 6,199,076 B1 | 3/2001 | Logan et al. | |
| 6,236,968 B1 | 5/2001 | Kanevsky et al. | |
| 6,539,360 B1 | 3/2003 | Kadaba | |
| 6,560,456 B1 | 5/2003 | Lohtia et al. | |
| 6,564,261 B1 | 5/2003 | Gudjonsson et al. | |
| 6,594,355 B1 * | 7/2003 | Deo | H04M 3/42136 719/315 |
| 6,625,461 B1 | 9/2003 | Bertacchi | |
| 6,639,919 B2 | 10/2003 | Kroninger et al. | |
| 6,688,435 B1 | 2/2004 | Will et al. | |
| 6,772,336 B1 | 8/2004 | Dixon, Jr. | |
| 6,873,688 B1 | 3/2005 | Aarnio | |
| 6,990,332 B2 | 1/2006 | Vihinen | |
| 7,027,567 B1 | 4/2006 | Scott et al. | |
| 7,149,537 B1 | 12/2006 | Kupsch et al. | |
| 7,154,060 B2 | 12/2006 | Rosenbaum et al. | |
| 7,222,081 B1 | 5/2007 | Sone | |
| 7,272,662 B2 | 9/2007 | Chesnais et al. | |
| 7,406,429 B2 | 7/2008 | Salonen | |
| 7,451,118 B2 | 11/2008 | McMeen et al. | |
| 7,580,862 B1 | 8/2009 | Montelo et al. | |
| 7,610,208 B2 | 10/2009 | Salonen | |
| 7,610,224 B2 | 10/2009 | Spiegel | |
| 7,619,584 B2 | 11/2009 | Wolf | |
| 7,660,397 B2 | 2/2010 | Heen et al. | |
| 7,844,674 B2 | 11/2010 | Madams et al. | |
| 7,996,023 B2 | 8/2011 | McGary et al. | |
| 8,050,664 B2 | 11/2011 | Salonen | |
| 8,145,245 B2 | 3/2012 | Aulu | |
| 8,296,228 B1 | 10/2012 | Kloor | |
| 8,359,242 B2 | 1/2013 | Guillot | |
| 8,577,401 B1 * | 11/2013 | Osinga | H04W 4/14 705/26.7 |
| 10,115,141 B1 * | 10/2018 | Warman | H04L 63/0281 |
| 10,157,362 B1 * | 12/2018 | Johansson | G06Q 10/083 |
| 2001/0037264 A1 | 11/2001 | Husemann et al. | |
| 2001/0049785 A1 | 12/2001 | Kawan et al. | |
| 2002/0004704 A1 | 1/2002 | Nagatsuma et al. | |
| 2002/0028686 A1 | 3/2002 | Kagi | |
| 2002/0032589 A1 | 3/2002 | Shah | |
| 2002/0035539 A1 | 3/2002 | O'Connell | |
| 2002/0059146 A1 | 5/2002 | Keech | |
| 2002/0080822 A1 | 6/2002 | Brown et al. | |
| 2002/0104007 A1 | 8/2002 | Moodie et al. | |
| 2002/0111914 A1 | 8/2002 | Terada et al. | |
| 2002/0120475 A1 * | 8/2002 | Morimoto | B65D 23/14 705/4 |
| 2002/0121962 A1 | 9/2002 | Wolfe | |
| 2002/0128908 A1 | 9/2002 | Levin et al. | |
| 2002/0165000 A1 | 11/2002 | Fok | |
| 2002/0173319 A1 | 11/2002 | Fostick | |
| 2002/0178122 A1 | 11/2002 | Maes | |
| 2002/0180696 A1 | 12/2002 | Maritzen et al. | |
| 2002/0184509 A1 | 12/2002 | Scheldt et al. | |
| 2002/0188562 A1 | 12/2002 | Igarashi | |
| 2002/0191795 A1 | 12/2002 | Wills | |
| 2003/0005126 A1 | 1/2003 | Schwartz et al. | |
| 2003/0074564 A1 * | 4/2003 | Peterson | G16H 10/60 713/182 |
| 2003/0101071 A1 | 5/2003 | Salonen | |
| 2003/0163536 A1 | 8/2003 | Pettine, Jr. | |
| 2003/0195811 A1 | 10/2003 | Hayes, Jr. et al. | |
| 2003/0211844 A1 | 11/2003 | Omori | |
| 2004/0097247 A1 | 5/2004 | Vilkuna et al. | |
| 2004/0128158 A1 * | 7/2004 | Salonen | G06Q 30/0623 380/270 |
| 2004/0128173 A1 | 7/2004 | Salonen | |
| 2004/0139318 A1 | 7/2004 | Fiala et al. | |
| 2004/0157628 A1 | 8/2004 | Daniel et al. | |
| 2004/0185883 A1 | 9/2004 | Rukman | |
| 2004/0198322 A1 | 10/2004 | Mercer | |
| 2004/0203619 A1 | 10/2004 | Tissot | |
| 2005/0027608 A1 | 2/2005 | Wiesmuller et al. | |
| 2005/0044042 A1 | 2/2005 | Mendiola et al. | |
| 2005/0054286 A1 | 3/2005 | Kanjilal | |
| 2005/0065995 A1 | 3/2005 | Millstein et al. | |
| 2005/0102230 A1 | 5/2005 | Haidar | |
| 2005/0171738 A1 | 8/2005 | Kadaba | |
| 2005/0246209 A1 | 11/2005 | Salonen | |
| 2005/0268107 A1 | 12/2005 | Harris et al. | |
| 2006/0010085 A1 | 1/2006 | McMeen et al. | |
| 2006/0040682 A1 | 2/2006 | Goertz et al. | |
| 2006/0047665 A1 * | 3/2006 | Neil | G06F 9/451 |
| 2006/0075139 A1 | 4/2006 | Jungck | |
| 2006/0131385 A1 | 6/2006 | Kim | |
| 2006/0168064 A1 | 7/2006 | Huynh et al. | |
| 2006/0224407 A1 | 10/2006 | Mills | |
| 2006/0271551 A1 | 11/2006 | Suojasto | |
| 2007/0010266 A1 | 1/2007 | Chaudhuri | |
| 2007/0033103 A1 | 2/2007 | Collins et al. | |
| 2007/0047533 A1 | 3/2007 | Criddle et al. | |
| 2007/0105536 A1 | 5/2007 | Tingo, Jr. | |
| 2007/0123246 A1 | 5/2007 | Daniel et al. | |
| 2007/0135101 A1 | 6/2007 | Ramati et al. | |
| 2007/0143230 A1 | 6/2007 | Narainsamy et al. | |
| 2007/0239578 A1 | 10/2007 | Klemens | |
| 2007/0288215 A1 | 12/2007 | Goldman | |
| 2008/0147408 A1 | 6/2008 | Da Palma | |
| 2008/0256191 A1 | 10/2008 | Murphy et al. | |
| 2008/0285475 A1 | 11/2008 | Menditto | |
| 2008/0317224 A1 | 12/2008 | Salonen | |

(56) References Cited

U.S. PATENT DOCUMENTS

| | | |
|---|---|---|
| 2009/0104925 A1 | 4/2009 | Aula |
| 2009/0175422 A1 | 7/2009 | Marics et al. |
| 2009/0264100 A1 | 10/2009 | Sapir et al. |
| 2009/0281929 A1 | 11/2009 | Boitet et al. |
| 2010/0030689 A1 | 2/2010 | Ramos et al. |
| 2013/0268384 A1 | 10/2013 | Salonen |
| 2014/0108247 A1 | 4/2014 | Artman et al. |
| 2014/0279276 A1 | 9/2014 | Tolcher |
| 2015/0186840 A1* | 7/2015 | Torres ............ G07F 17/13 705/339 |
| 2016/0178379 A1 | 6/2016 | Mararu et al. |
| 2016/0371702 A1* | 12/2016 | Kim ............ G06Q 30/0631 |
| 2018/0211284 A1* | 7/2018 | Srinivasan ...... G06Q 30/0269 |
| 2018/0211346 A1* | 7/2018 | Morren .......... G06Q 30/0207 |

FOREIGN PATENT DOCUMENTS

| | | |
|---|---|---|
| EP | 0967754 A2 | 12/1999 |
| EP | 1065899 A1 | 3/2001 |
| EP | 1139233 A1 | 10/2001 |
| EP | 1458201 A1 | 9/2004 |
| EP | 1546938 A1 | 6/2005 |
| FI | 20011680 A | 2/2003 |
| FI | 000117663 B | 12/2006 |
| FI | 20060387 A | 10/2007 |
| FI | 000118586 B | 12/2007 |
| GB | 2391646 A | 11/2004 |
| GB | 2435565 A | 8/2007 |
| KR | 20040013261 A2 | 2/2004 |
| WO | 9706603 A2 | 2/1997 |
| WO | 0041102 A2 | 7/2000 |
| WO | 0052601 A1 | 9/2000 |
| WO | 01013299 A2 | 2/2001 |
| WO | 0139033 A1 | 5/2001 |
| WO | 0153991 A1 | 7/2001 |
| WO | 2002067602 A1 | 8/2002 |
| WO | 2004019223 A1 | 3/2004 |
| WO | 2006122399 A1 | 11/2006 |
| WO | 2007063179 A1 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

Content Gateway, Version 4.0; Development and Billing Manual; Jan. 1, 2005, Telia Sonera Finland Oy; www.sonera.fi/files/sonera.fi/.

Elisa Plc's Press Release; BookIT Ltd. and Elisa Implement a Handy Mobile Phone-Enabled Check-In Service for Finnair; Jun. 9, 2004; www.elisa.fi.

Elisa Plc's Press Release; Innovative Solution Receives 2004 European Good Practice Award in Occupational Health and Safety and the appendix BookIT case.pdf; Nov. 22, 2004.

Empower Interactive Group Ltd.; Virtual Mobile Redirector-Product Information Document; Unknown 2001.

Finnair Plc's Press Release; Finnair to Introduce the World's Easiest Check-In with a Text Message; Jun. 9, 2004; www.bookit.net/news.

Finnish Search Report; dated May 4, 2006.

Finnish Search Report; dated Jun. 3, 2009.

Kauppalehti; Mobiilipalvelujen Oltava Yksinkertaisia; BookIT:n Jukka Salonen uskoo tavallisiin tekstiviesteihin; Heikki Nenonen; Jun. 9, 2005; p. 19.

Mobileway; Mobileway Launches its Mobile Transaction Tracker Solution—An Interactive Platform to Authenticate Macropayment Made by Mobile Consumers; Jul. 2002; pp. 1-2; United States.

Mouly et al.; The GSM System for Mobile Communications; Unknown 1992; pp. 556-560; Palaiseau.

Penttinen; GSM-tekniikka; WSOY; Unknown 1999; pp. 155-157, 222 and 331-332; Porvoo.

Verkkouutiset; Sonera Tarjoaa Matkaviestinoperaattoreille Content Gateway—Palvelualustaa; Feb. 21, 2001; www.verkkouutiset.fi.

\* cited by examiner

PRODUCT/SERVICE RESERVATION AND DELIVERY FACILITATION WITH SEMANTIC ANALYSIS ENABLED DIALOG ASSISTANCE

CO-PENDING APPLICATIONS AND CONTINUITY DATA

This patent application is a continuation of U.S. patent application Ser. No. 14/640,206, filed Mar. 6, 2015 which is a continuation-in-part of U.S. patent application Ser. No. 13/897,785, filed May 20, 2013, which application is a continuation of U.S. patent application Ser. No. 12/972,610, filed Dec. 20, 2010, which is a continuation of U.S. patent application Ser. No. 11/980,470, filed Oct. 31, 2007, now U.S. Pat. No. 8,050,664, which is a continuation of U.S. patent application Ser. No. 10/227,194, filed Aug. 21, 2002, now U.S. Pat. No. 7,406,429, which claims priority to Finnish Patent Application No. 20011680, filed Aug. 21, 2001, the disclosures of which are incorporated herein by reference in their entirety. This patent application is also a continuation-in-part application of U.S. patent application Ser. No. 12/401,392, filed Mar. 10, 2009, the disclosure of which being incorporated herein by reference in its entirety.

FIELD

Disclosed embodiments relate to methods and systems utilizing telecommunications to aid in the booking of a reservation in a booking system for a user, synchronizing bookings for the user, delivery of a product or service for the user, etc., wherein the booking, reservation, product and/or service may be provided by one or more booking systems, and product and/or service providers while the disclosed embodiments may be implemented as mediator that interacts with the user and these entities as a facilitator.

BACKGROUND

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices requires standards on several levels. It is not enough to have, say, common communication protocols. It would be very important to share common concepts and understanding what a certain piece of data means in a certain context. However, it has been very difficult to agree on those issues, as there exist an enormous number of companies, organizations, and other actors in the field.

Many services must be able to manage bookings. They include for example hooking appointments for health services; hooking travel reservations for hotels, airlines, and rental cars; hooking tickets for venues; booking appointments for vehicle maintenance; hooking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

There are many methods to exchange information between services. Speaking of services that include booking or calendar functions, information exchange often takes place as synchronizing booking or calendar entries. For that purpose, several important standardization efforts are going on. For example, SyncML is an industry initiative to develop and promote a single, common data synchronization protocol.

vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

As these examples show, there have been lots of efforts to build systems that can synchronize hooking systems. A common problem with all of these existing solutions is that they do not provide common semantics for different systems. For example, if an entry is tentative, different systems may interpret it in different ways.

Another problem is that booking systems have multiple different and usually quite complex user interfaces. If a customer wants to both make an appointment with a dentist and book a taxi to take him or her there, the customer needs to enter all the booking information to both booking systems in different ways.

One more problem is that it becomes challenging to manage client replies, if a client has been given a number of questions. For example, it makes sense to use SMS text messages to ask client which option he or she chooses, because in many countries, like in Finland, it is very common to communicate with SMS text messages and they create revenues to operators. However, if a client replies to several inquiries by sending a number of text messages, it can be troublesome to find out, which answer corresponds to a certain question because the reply does not automatically include a reference to the question. Say, a service asks a client if he or she wants to reserve-in addition to a flight ticket-also a taxi and a hotel room, and the client replies "yes" to one question but "no" to the other, the service does not necessarily know which offer the client has accepted.

SUMMARY

Disclosed embodiments minimize or eliminate drawbacks referred above or at least significantly alleviate them and enable a new kind of value added service for customers/consumers/users via their mobile terminals, e.g., mobile phones.

Disclosed embodiments provide a method and system capable of facilitating booking type transactions, and/or delivery of products/services involving at least one service/product provider and users communicating with mobile terminals capable of receiving and sending short text messages.

Disclosed embodiments provide a method and system capable of facilitating booking type transactions and a plurality of product/service providers and a plurality of users who are each communicating with mobile terminals capable of receiving and sending short text messages.

BRIEF DESCRIPTION OF THE DRAWINGS

Herein, disclosed embodiments will he described in detail by the aid of a few examples, in which.

DETAILED DESCRIPTION

Figure 1:
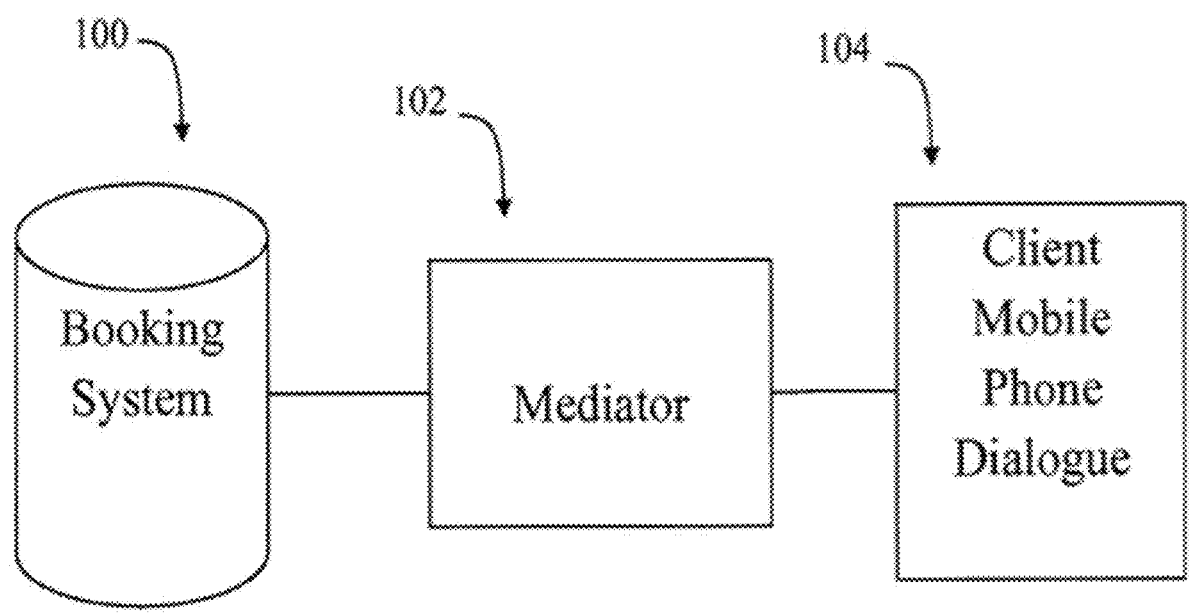
FIG. 1 represents one advantageous system in accordance with disclosed embodiments.

Disclosed embodiments relate to exchanging and synchronizing information between booking systems and user terminal devices. The services may be for example booking appointments for health services; booking travel reservations for hotels, airlines, and rental cars; booking tickets for venues; booking appointments for vehicle maintenance; hooking maintenance for apartments; and so on.

The booking system, in accordance with disclosed embodiments, comprises at least one service provider hooking system; at least one service provider; a mediator; a client; at least one client terminal device that can be a mobile device capable of receiving text messages, and that includes a dialogue; and telecommunication connections that are used to connect the service provider booking systems, the service providers, the mediator and the client terminal device to one another.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are may be applications operating on network servers such as the Internet or a private Intranet. In general, a system will comprise a plurality of service providers and service provider booking systems (implementing service provider booking services), but it is possible to have a simple booking system for only one service provider in which case the mediator and service provider could be tightly integrated into a single application.

Clients may, for example, include clients communicating on mobile telephones capable of receiving short text messages, such as Short Message Service (SMS) messages. Of course, a system that is capable of handling SMS messages will also handle other clients with greater capabilities. The mediator may communicate with mobile telephone clients through an SMS gateway, such as are operated by mobile telephone providers and a well known today. The mediator communicates with clients using dialogues. Dialogues are short messages which present information to the client and allow a simple reply. Dialogues may provide users with simple choices such as yes/no or to allow a selection from an ordered list. Dialogues can also be one way, such as to acknowledge a reservation. A transaction may typically involve a sequence of dialogues each involving a simple response. Dialogues will typically involve asynchronous communication by messages. The system as described makes it possible to coordinate bookings among different service provider systems in order to fill a client's need, for example coordination of an airline hooking with transportation to the airport.

FIG. 1 is a diagram of the simplest system comprising a single service provider hooking system 100 for a single service provider, a mediator 102 communicating with the service provider over a network, and a user with a mobile phone having a dialogue entered thereon.

Figure 2:
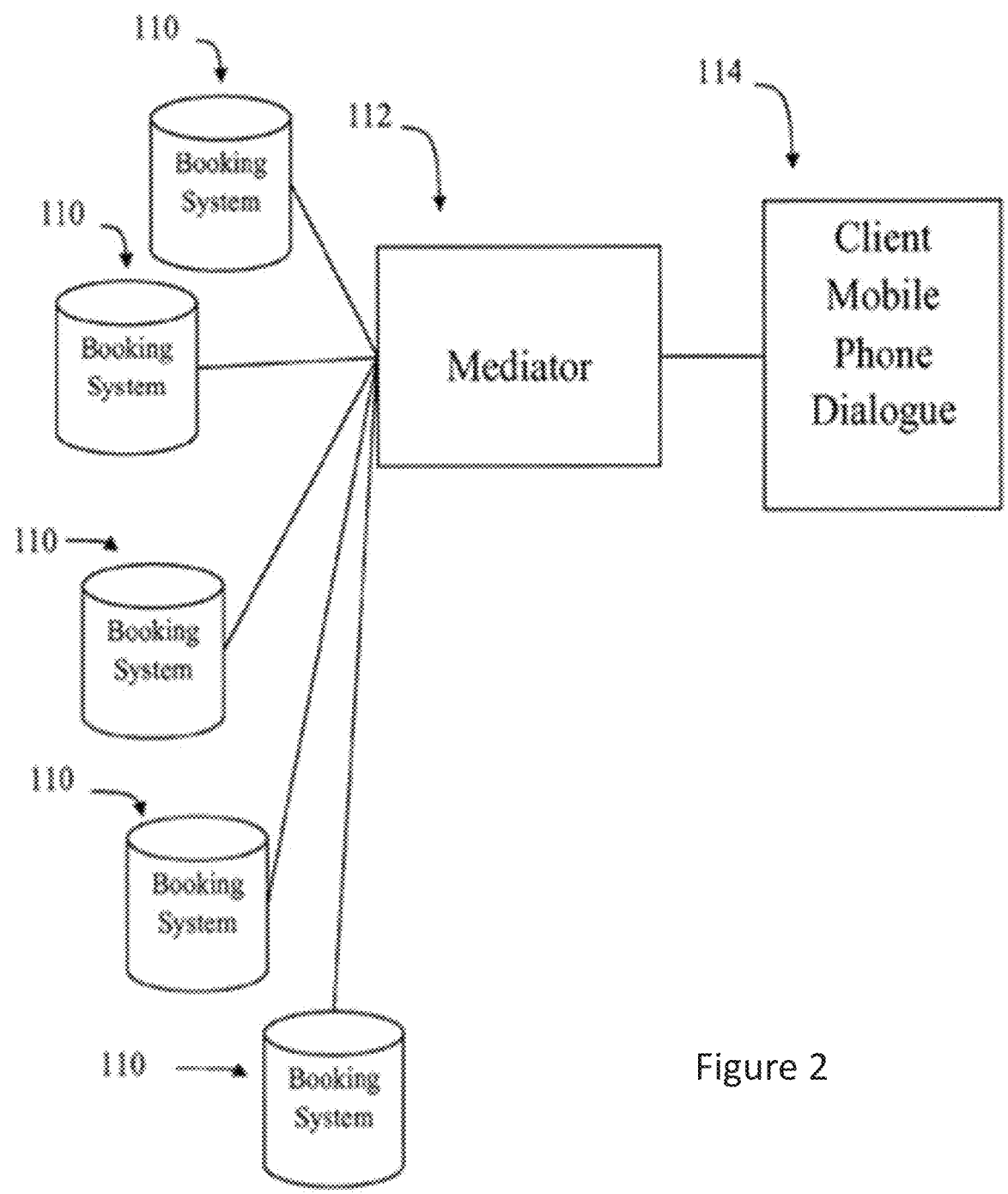
FIG. 2 represents a second advantageous system in accordance with disclosed embodiments.

FIG. 2 shows a plurality of service provider booking systems communicating with a mediator over a network.

Figure 3:
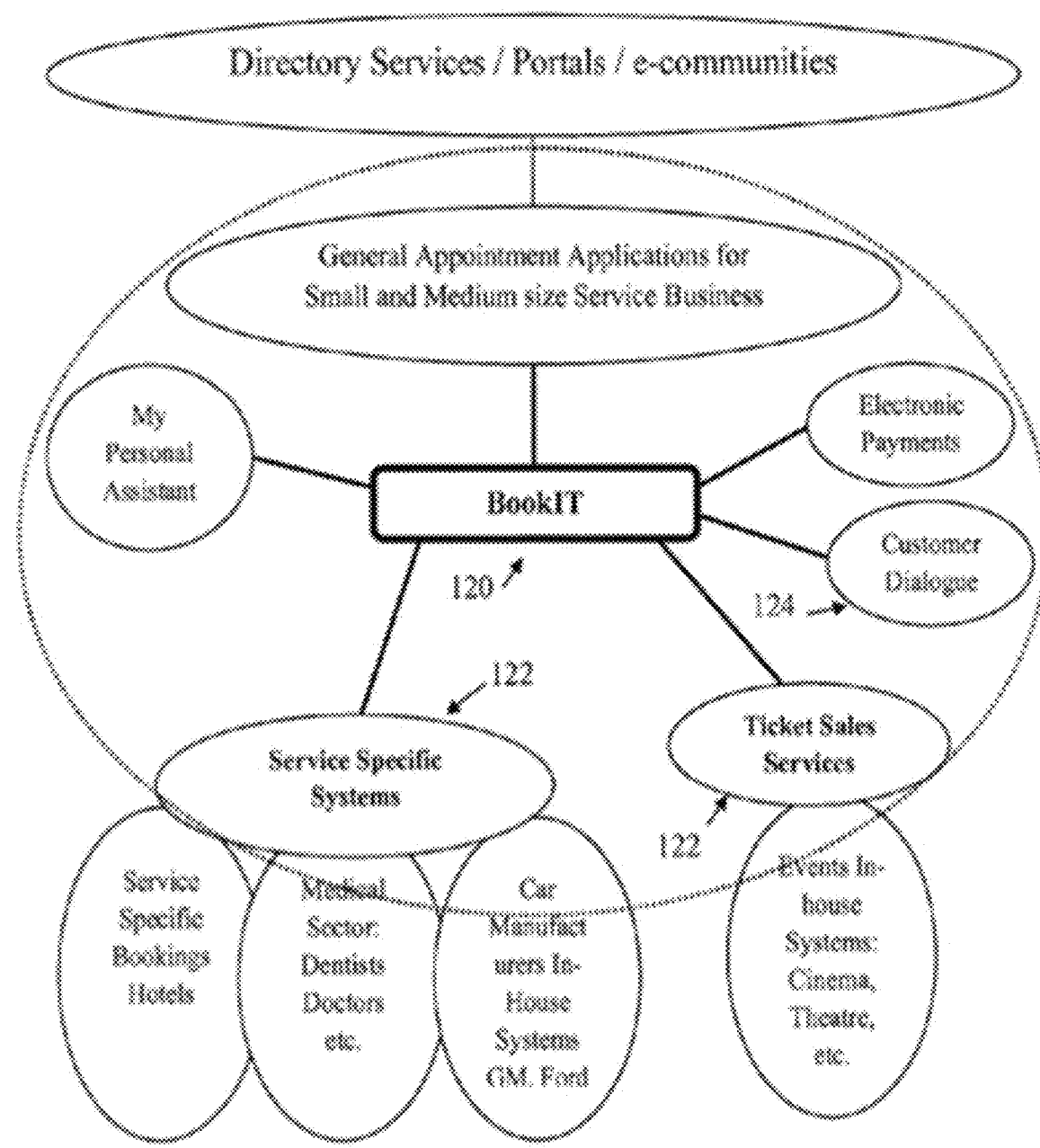
FIG. 3 represents a third advantageous system in accordance with disclosed embodiments.

FIG. 3 shows a mediator named BookIT communicating with various service provider systems and users with telephone devices communicating dialogues.

A reason-based customer dialogue is a desirable improvement from the client's point of view, because service providers can create their own dialogues in connection with each booking event. A dialogue is closely related to a certain booking situation. It becomes triggered automatically at the right moment, or the client can activate the dialogue as needed, or another entity in the system can send a message to the dialogue to activate it. The dialogue then sends an inquiry to another entity in the system or informs the client and possibly inquires client's choices. By means of this kind of dialogue, the client can make reservations in several booking systems using only one user interface. The dialogue connects to remote booking systems e.g. through the Internet or even mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialogue between the client, the mediator and the booking systems as well as stored customer profiles ensure that the client gets the reason-based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their hooking systems together to provide more comprehensive services without extending their businesses unnecessarily. Because of internationalization, the mediator is able to support for example many languages, time zones, currencies, and data formats.

The system, including at least a dialogue, a mediator, a service provider, and a service provider booking system, can be on one of the following levels:

1. There is a predetermined set of dialogues in the system. Their content and the possible choices are set in advance. For example, if a client books a flight, a dialogue always offers certain other bookings. Client's prior actions are not taken into consideration.

2. There is an unlimited number of dynamic or "intelligent" dialogues that arc based on, for instance, a profile that a client has created himself or herself, usage history records, and client's location. Simple logic supports decisions. It is a low-level expert system.

3. The system is able to make decisions by itself and to support client's decision making. On this level, a dialogue may include a high-level expert system. It can act as an agent and negotiate with several service providers to get the best offer without client's direct involvement.

In one disclosed embodiment of the method, a client books a service from a service provider. The booking may be carried out using a terminal that is connected to the mediator service. First, the client connects to the mediator service using a dialogue. The client inputs reservation inquiry to the dialogue that sends the inquiry to the mediator. The mediator inquires possible reservations from service provider's information system using concepts and terminology that those services are able to interpret. The inquiry is based on client's preferences. The client discloses some preferences that are related to the specific booking when he or she inputs reservation inquiry to the dialogue. In addition, the dialogue and the mediator service may have stored client's general preferences and use them so that the client do not need to input all the preferences each time.

Managing the inquiry and bookings is based on sophisticated state models. Each booking involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. An exemplary booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialogue that shows a simple list of options to the client. For example, the dialogue may show three options for a flight and ask if the client also wants to reserve a taxi that is actually already tentatively booked by the mediator. The client makes his or her decision by choosing the options from the simple list of alternatives. The dialogue sends information on client's choice to the mediator that confirms the bookings in accordance with client's choices and cancels the unnecessary reservations.

Figure 4:
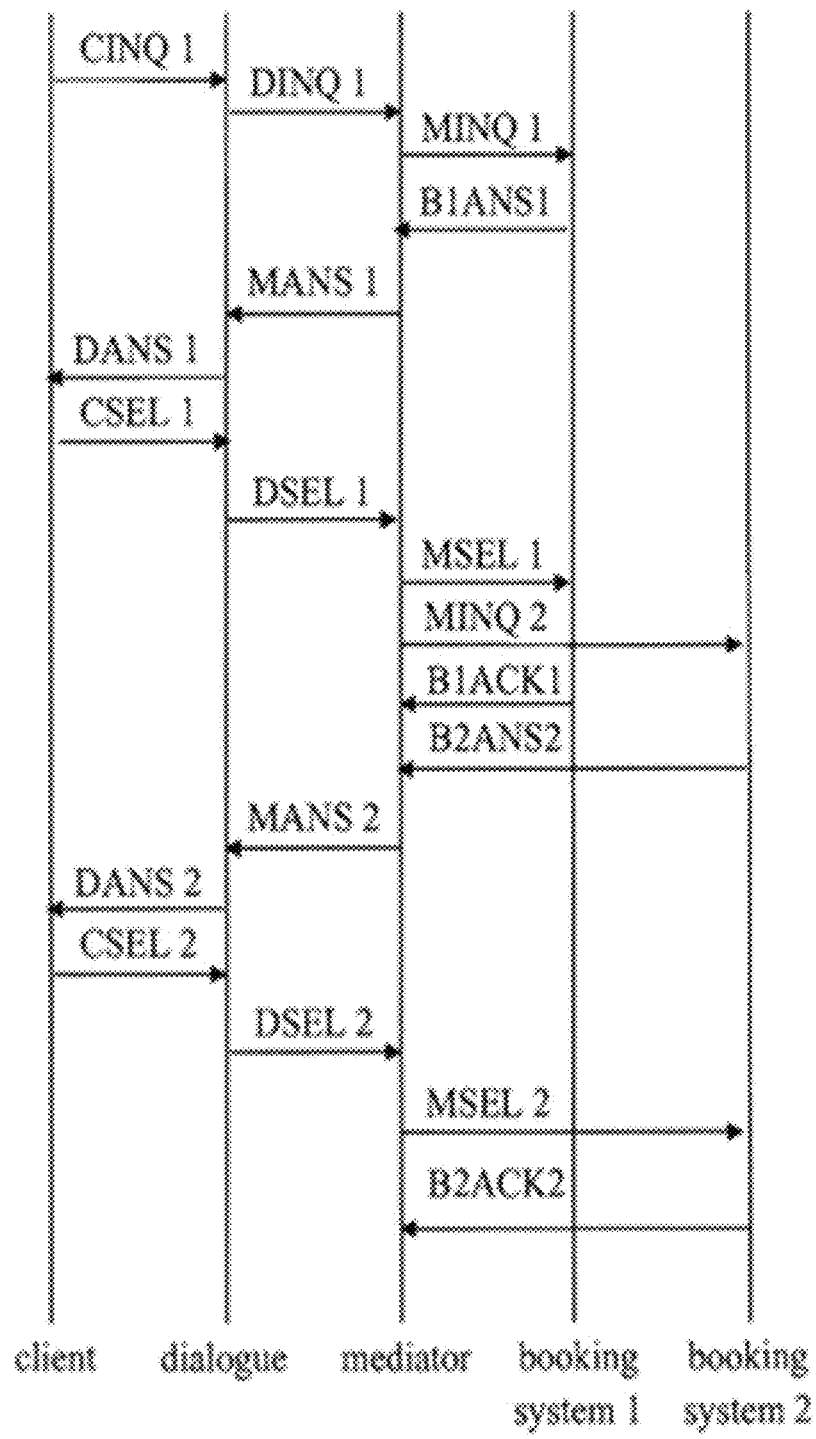
FIG. 4 is one advantageous example of a sequence diagram representing messages transmitted within a system in accordance with disclosed embodiments.

FIG. 4 shows a sequence diagram of an inquiry CINQ1 originated by a client using a dialogue DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
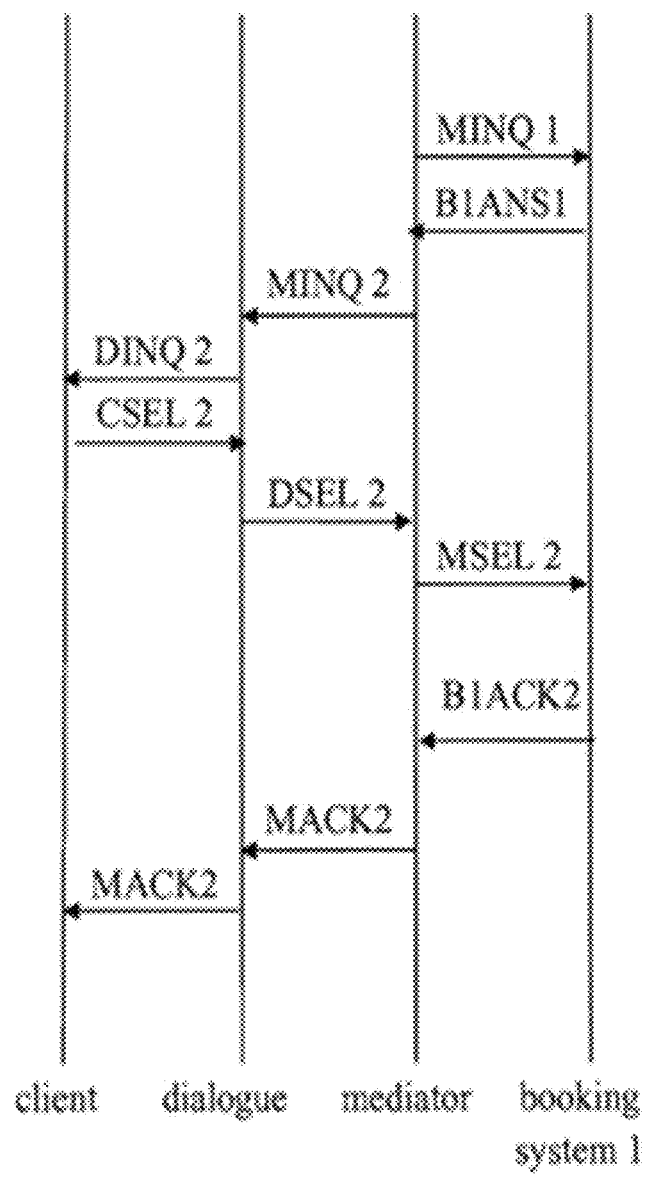
FIG. 5 is a second advantageous example of a sequence diagram representing messages transmitted within a system in accordance with disclosed embodiments.

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialogue shows the options in a simple and handy way. The client needs only to choose which option is the best for him or her or whether he or she wants to get new options or postpone the booking. FIG. 5 is a time sequence chart for such a situation where the original inquiry, MINQE was initiated by the mediator.

EXAMPLE 1: A BOOKING SYSTEM

An exemplary booking system according to disclosed embodiments, is described below. The system is designed to interface between service provider booking systems and other parties over a network such as the Internet, and to end user clients equipped with mobile phones capable of receiving text messages. The former may be accomplished with a generic XML interface. The system may support vCard and vCalendar standards since they are used by all major booking and calendar systems.

The system may communicates with mobile phone users using Short Message Service (SMS) via an SMS Gateway for asynchronous communication. The system may use the novel Dynamic Dialogue Matrix (DDM) for secure transfer and matching of the SMS messages. The DDM is described further below.

A clear distinction may be made between a service provider booking process and a system accordingly to the disclosed embodiments. The former covers the standard booking only with time and resource reservation. The latter provides the ability to book, work, and finance the transaction. Both the conventional process and a booking process implemented according to the disclosed embodiments end at the same point. However, the disclosed booking process provides additional security and intelligence that is lacking in the conventional process. The disclosed booking process consists of seven phases as follows:

Phases (Status Handling)

The phases make a bond (rubber band) between the resources. In each of the disclosed process phases, the data related to the booking will be amended to reflect the needs of the phase in question. For the statuses and values please see the underneath table.

The phases are described in more detail in the following discussion.

1. Filing: initialization of a hooking process. As a result of the initialization, an entry is inserted in the database w/basic information. It will not appear in a calendar since there is no scheduling information. It can be displayed in a separate task list of the owner as an open task.

2. Requesting: in the Requesting phase a booking request is sent to the resources required for the previously filed task. Since there is no scheduling, which in most cases will be essential, this phase may be executed together with the Scheduling phase.

3. Scheduling: the Schedule is given to the owner and the resources. As a part and a result of the Scheduling the following data is needed: a suggested start-time (ISO time-stamp w/time zone), b suggested start-location (coordinates), c suggested end-time (ISO time-stamp w/time zone), d suggested end-location (coordinates).

4. Confirming: time and location as it is accepted by the resources that have accepted. Data related to this phase: a accepted start-time (ISO time-stamp w/time zone), b accepted start-location (coordinates), c accepted end-time (ISO time-stamp w/time zone), d accepted end-location (coordinates)

By default the data is copied from the scheduling phase.

In practice, if scheduled time is not needed, the same data structures can be used for this and status indicates the actual meaning of the data.

5. Working: the resources perform the booked task. Data related to this phase consists of different attributes and their values, which are related to the actual task. In addition, following static structures are needed: an actual start-time (ISO time-stamp w/time zone), b actual start-location (coordinates), c actual end-time (ISO time-stamp w/time zone), d actual end-location (coordinates), e products used, extras, mileage.

By default the data is copied from the Confirming phase.

6. Accounting: At this point all data stored in the data structures on previous phases is analyzed and processed for invoicing purposes.

Data related to this phase: Accounting data. To be defined separately.

7. Completing: the task has been completed. From the whole process point of view, it is irrelevant whether the task succeeded or not. It is relevant to the Accounting phase, in which the financial actions to the organizer are handled. In this phase, housekeeping (database contents; temporary files, . . . ) is made in order to complete the booking process in accordance with the disclosed embodiments.

The following table shows data available in each phase.

| Phase/Data | Identifying | Resources | Suggested time | Accepted time | Task's work related | Accounting | Closing |
|---|---|---|---|---|---|---|---|
| Filing | X | | | | | X | |
| Requesting | X | X | | | | X | |
| Scheduling | X | X | X | | | X | |
| Confirming | X | X | X | X | | X | |
| Working | X | X | X | X | X | X | |
| Accounting | X | X | X | X | X | X | |
| Completing | X | X | X | X | X | X | X |

The following table describes the phases, their statuses, and values along with transition to next logical phase based on the values gotten. In addition, corresponding vCalendar statuses are shown when applicable.

| Phase | Satus | Next Phase | vEvent | vTodo |
|---|---|---|---|---|
| Filing | | Requesting | | |
| Requesting | | Scheduling | Sent | Sent |
| Scheduling | Pending | Confirming | Needs action | Needs action |
| Scheduling | Scheduled | Confirming | Needs action | Needs action |
| Scheduling | Re-scheduled | Confirming | Needs action | Needs action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re-scheduling requested | Accounting or Scheduling | | |
| Confirming | InProgress | Working | | |
| Working | InProgress | Working | | |

-continued

| Phase | Satus | Next Phase | vEvent | vTodo |
|---|---|---|---|---|
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| <Phase y> | Paused | <Status x> |
|---|---|---|
| <Phase y> | Re-started | <Status x> |
| <Phase y> | Cancelled | Accounting |

Figure 6:
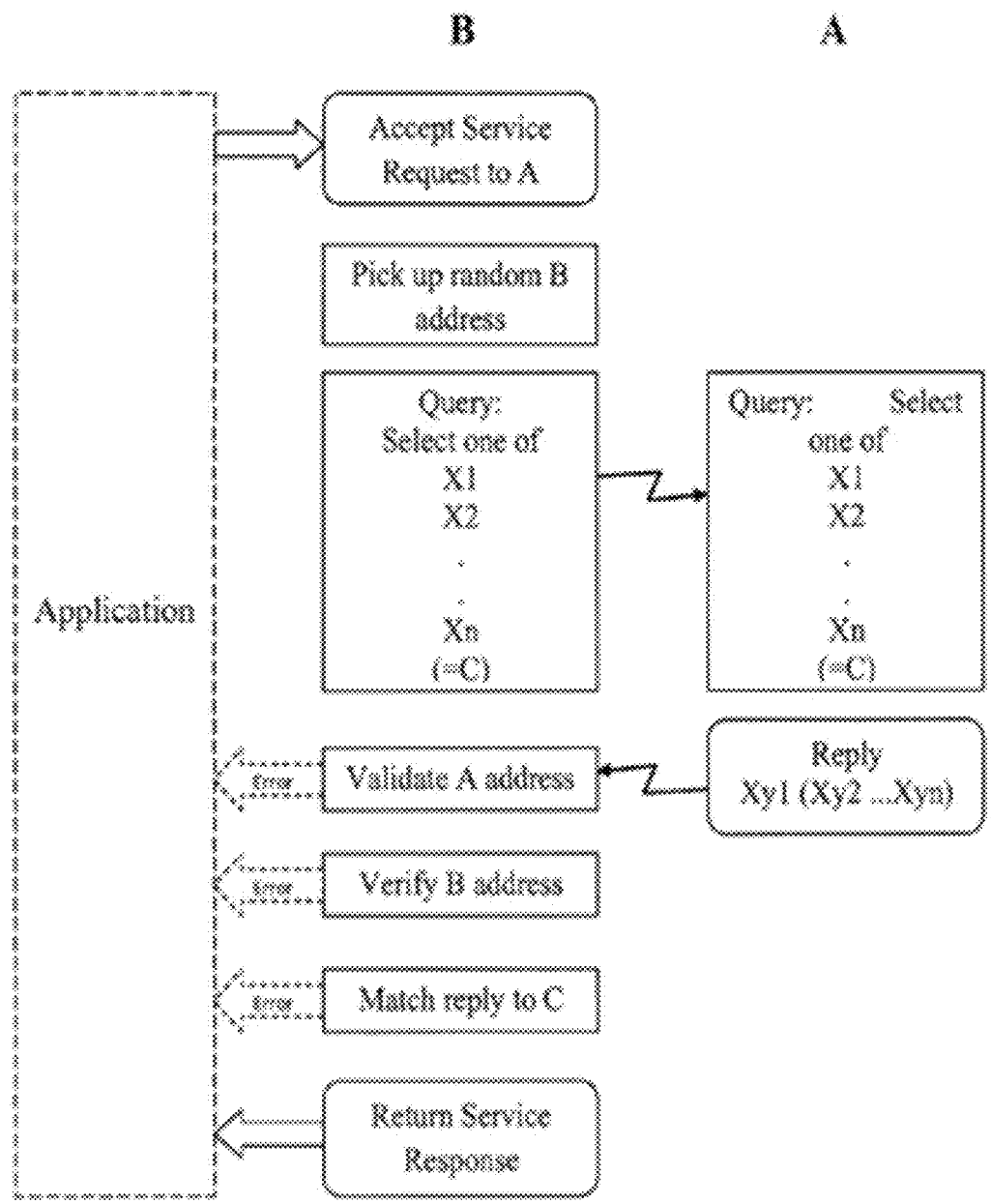
FIG. 6 shows an example of the dynamic dialog matrix applied to a query and reply according to disclosed embodiments.

FIG. 6 shows the work flow transitions from phase to phase. For conditions, see the table above. Also, please note that Canceled Status always leads to Accounting.

Confirming the (Whole) Reservation

In order for the whole Reservation to be successful, all resources, which accepted the reservation, need to have the same scheduling. In addition, there will resources in different roles and data related to the working phase may vary even greatly.

The different statuses of the whole reservation are: a "NoReplies" (0) for "No-one hasn't replied to the request made by the organizer," b "NoDeclines" (1) for "Not all invitees have replied yet. The ones who have replied have accepted;" c "AllAccepts" (2) for "all invitees have confirmed;" d "SomeDeclines" (3) for "Some of the invitees have declined; e "All Declines;" (4) for "All of the invitees have declined."

The following decision table helps in evaluating the status of the whole hooking. "Maybe" means that this condition only does not incontestably specify true or false result.

| | Booking Status | | | | | | |
|---|---|---|---|---|---|---|---|
| Confirmations | No one answered | No one accepted | Some Accepted | All accepted | No one declined | Some declined | All declined |
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

One major problem solved by disclosed embodiments is the challenge of managing client replies, when a client has been given a number of questions and the client is using SMS text messages or similar technology in which a reply does not automatically include an explicit reference to the inquiry. Disclosed embodiments solve this problem using dynamic dialog matrices. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you need a taxi also?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding shell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers, because each A number can be used in combination with each B number, which together identify the session to which each message corresponds. A dialog matrix can also be used to find out which A subscriber numbers can be used when the next inquiry to a certain client is sent.

Figure 7:
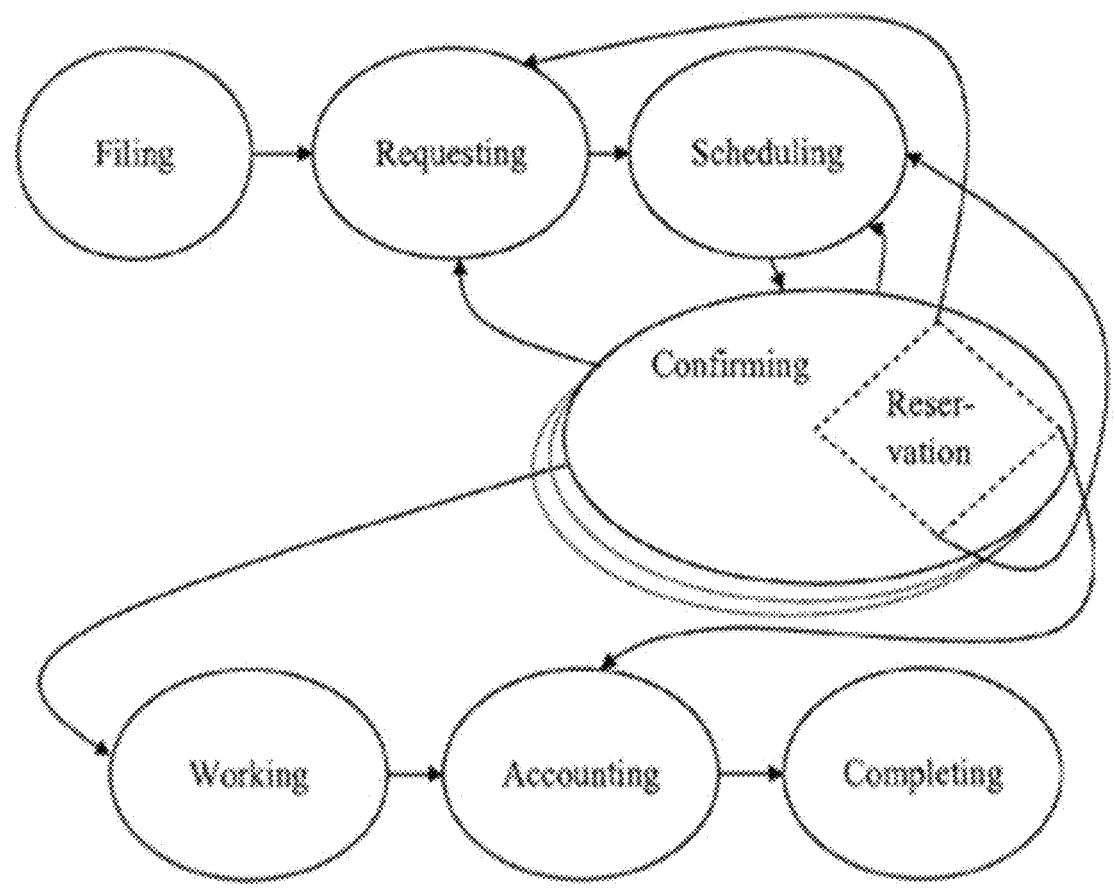
FIG. 7 shows the phases of the booking process in a disclosed embodiment.

The use of the Dynamic Dialog Matrix as described above is illustrated in FIG. 7.

The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, potentially randomly or pseudo-randomly chosen, reply number. Thus an acceptable answer is only the one that is sent to the correct reply address corresponding to that particular sender address, containing reply content that has been identified as acceptable for that particular message and in which the message is received within the acceptable reply period established for the session.

EXAMPLE 2: USE OF THE DYNAMIC DIALOGUE MATRIX

This simple example deals with securing tickets on a morning flight tomorrow. The system sends a series of questions as SMS messages requiring a short response. Each message is earmarked so that its response can be identified so the messages need not necessarily be sent or replied to in a particular sequence unless logic so demands (for instance, if the answer to one question affects the content of the next question).

A user whose phone number is ID=0418 979 813 has requested the ticket. The system sends the following requests as individual SMS messages:

Please choose one of the following departure times: 6:00 a.m., answer A, 7:30 a.m., answer B, 8:15 a.m., answer C, If none of these is OK, answer D. Sender: +358440844 027

Please choose ticket class: First class, answer A, Business class, answer B, Economy class, answer C, Cheapest available, answer D. Sender: +358440844 011

Please choose: Window seat, answer A, Aisle seat, answer C. Sender: +358440844 034

Please select the meal: Vegetarian, answer A, Beef, answer B, Chicken, answer C. Sender: +358440844 003

The answers received from the customer to the preceding questions and several others were as follows: 'A' to question with ref. no +358 440 844 027, 'D' to question with ref. no +358 440 844 011, 'A' to question with ref. no +358 440 844 034, 'B' to question with ref. no +358 440 844 003, 'D' to question with ref. no +358 440 859 751, 'A' to question with ref. no +358 440 844 277, 'C' to question with ref. no +358 440 841 368. From this, the service provider can find out that the customer chose: the first morning flight (=A), cheapest available ticket (=D), window seat (=A), beef for meal (=B), and etc.

It is important to note with the matrix the customer can answer the questions in any order, and can even fail to answer some questions. If these are relevant, the system can urge for an answer. If not, the system can proceed without this information.

Figure 8:
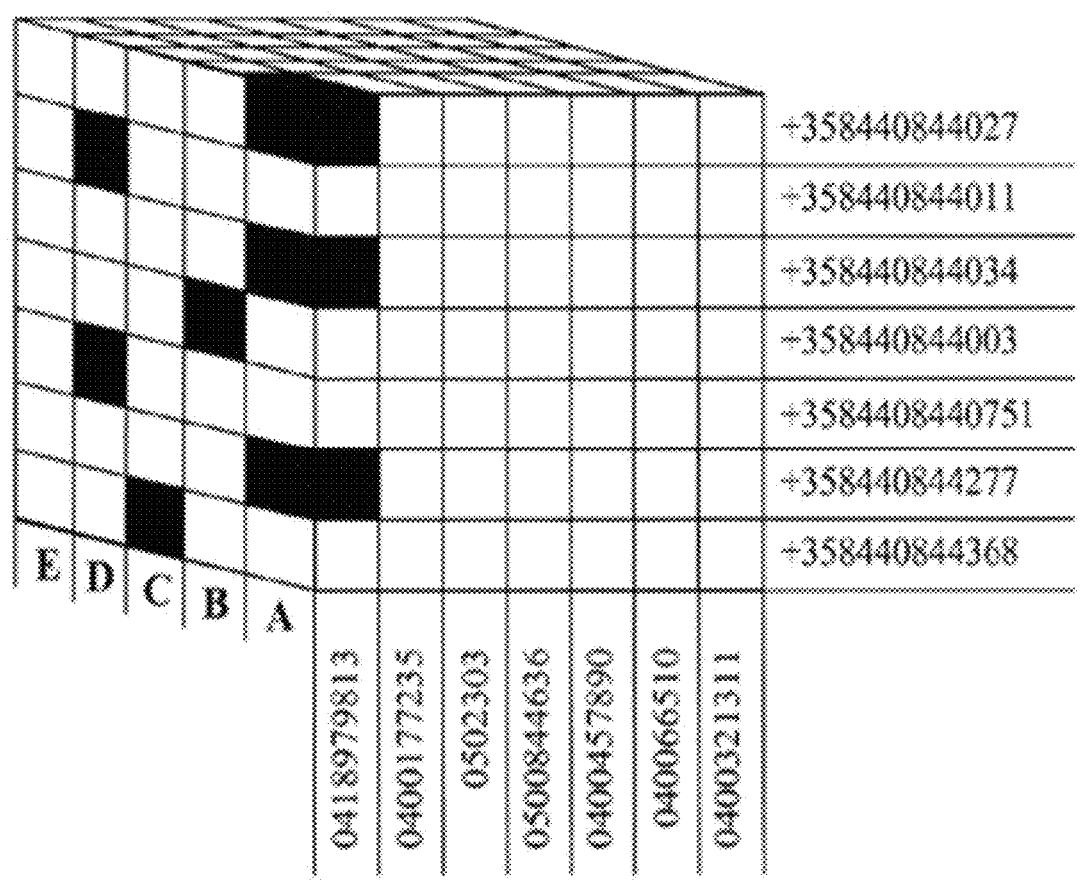
FIG. 8 shows a matrix diagram corresponding to Example 2, according to a preferred embodiment of disclosed embodiments.

The above responses are shown on FIG. 8 as a three dimensional matrix with customer numbers plotted on the X-axis, reply numbers are plotted on the Y-axis and answers plotted on the Z-axis. Our user with phone number 0418 979 813 is the left most user along the X-axis. The answers are plotted along the Z-axis corresponding to the reply numbers on the Y-axis.

Although the above example provides an understanding of the utility of the disclosed embodiments in relationship to facilitating a booking a flight reservation, the disclosed embodiments are also instrumental and useful in delivering goods or services to customers. Conventional delivery of goods is provided based on a predetermined delivery address, which is static for each person.

However, in the people often have several delivery addresses, for example, a home address, work address, vacation home address etc. Conventional delivery systems send goods to one of those static addresses and, at most, may check if the person to whom the package is to be delivered is actually at that static address. For example a package sent from Finland to the United Kingdom to a predetermined delivery address (also referred to as a mailing address, or end address in this document and its incorporated documents) will first be received by a Finnish post office. From that office, the package is delivered to the international department and further collected into a group of packages heading to the UK. Once in the UK, the package will first reach a sorting office and will be sent, in accordance with the mailing address, to the corresponding branch post office. The branch post office then delivers the package to the mailing address for the package.

As a result of this conventional delivery approach, and the component routing steps, there may be several false delivery attempts. This causes trouble both for the package delivery company and for the customer in the form of additional cost; additionally, unnecessary delivery attempts also have a negative ecological effect in the form of increased carbon emissions.

Accordingly, disclosed embodiments may be utilized to reduce or eliminate these problems and, also create an entirely new type of method and system for delivery of goods. More specifically, use of the customer's mobile terminal as a "virtual address" enables the ability to inquire with the customer as to an acceptable, most preferred, most convenient location, etc. for a corresponding "actual destination address" for the goods. Considerable advantages may be gained with the aid of the disclosed embodiments because the disclosed mediator may be utilized as a mechanism for facilitating a dynamic delivery address for the customer which may he constantly updated based on the customer's response to one or more inquiries from the mediator. By this feature, essential cost savings may be gained in the delivery organization side. As a consequence, also the ultimate cost for delivery to the customer can be reduced.

Thus, a session may correspond to the interactions associated between a deliverer or delivery service (utilizing the mediator) and a parcel recipient. Accordingly, such a session, and associated session-variables, such as delivery-location and scheduled-delivery-time may be managed by the mediator in relation to the desired future state of the actual, physical parcel. In this way, the communication between the mediator and the postal or delivery customer (e.g., parcel recipient) becomes an indirect "remote controller" for the actual parcel, whereby the recipient is able to dynamically control the timing and location of parcel delivery, and any other parameters such as whether the parcel requires a signature or whether the parcel should be left at a doorstep, etc. Further, the "session" may be controlled or facilitated by the mediator thereby indirectly controlling and instructing delivery of the actual parcel through coordination of delivery systems, mechanisms and personnel. In this manner, the point of delivery in space and time remains "live" until it would be impossible to alter the actual delivery path, e.g., the virtual delivery can be changed within certain time periods in advance of the actual delivery, and the actual, physical delivery processes will follow the changes.

Accordingly, a goods delivery firm may gain some degree of benefit by utilizing a mediator facilitated session to obtain an updated actual delivery address from the customer via their mobile terminal without changing the general delivery system. This is particularly valuable because delivery systems like mailing systems and courier services are based on highly standardized solutions where there is no or little room for major system changes.

Figure 9:
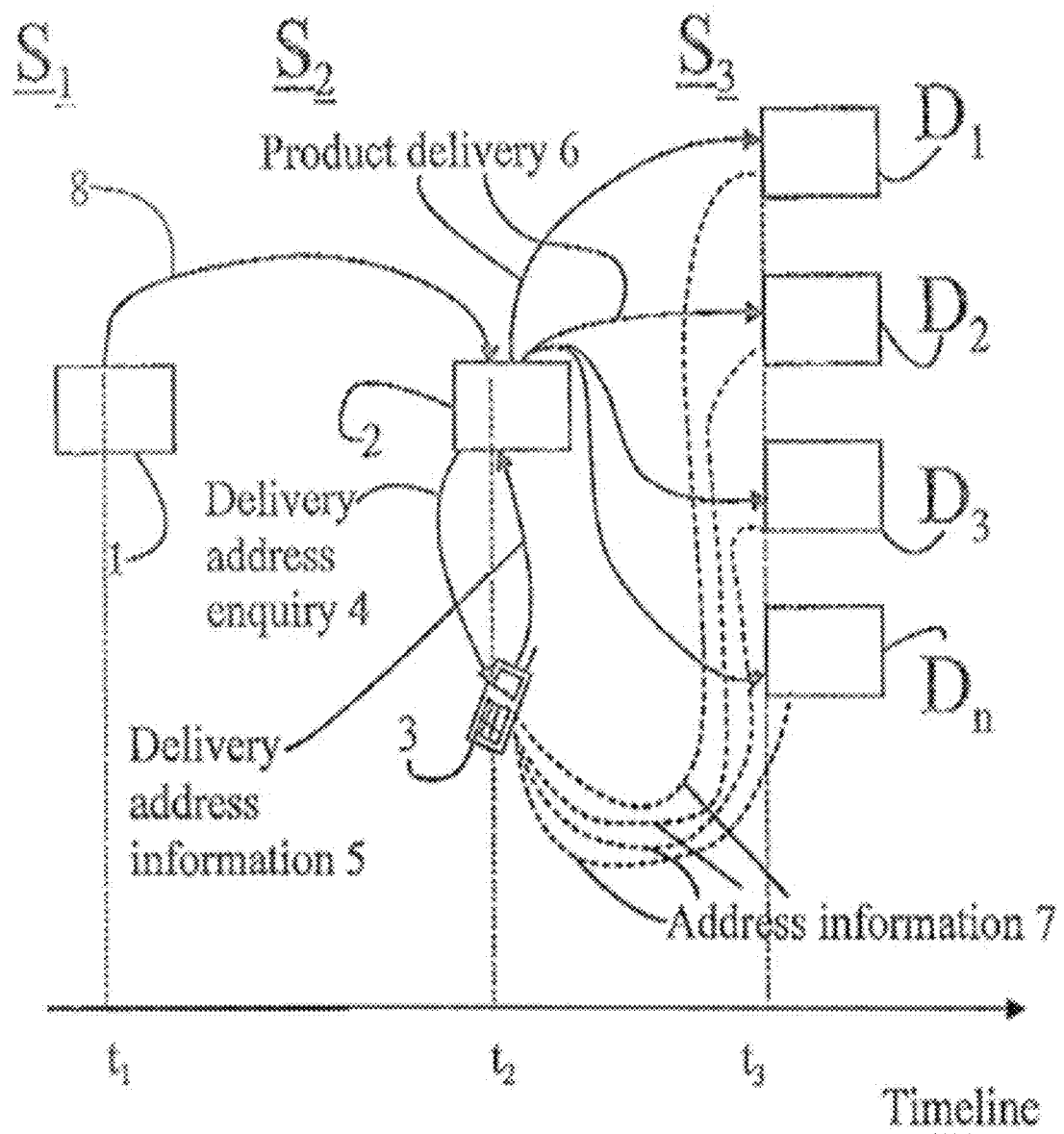
FIG. 9 shows schematically a solution according to a disclosed embodiment for delivering goods to a user at a specified delivery address from among a plurality of such addresses.

As illustrated in FIG. 9, at least one disclosed embodiment may be utilized to provide a solution for delivering goods to a customer wherein a sorting office 1 and branch post office 2 interact in order to deliver a product to a client 3 with a client' mobile terminal. Accordingly, the client's mobile terminal receives a delivery address inquiry 4 with delivery address information 5.

In the prior art delivery systems, goods would have been delivered from the system $S_1$ through system $S_2$ to one of the destination addresses $D_1$-$D_n$ in the end address system $S_3$ in accordance with one address information defined before the delivery process.

In at least one disclosed embodiment, the sorting office 1 may send information to the branch post office 2 of a package that will be sent to a customer. This information may be sent, e.g., electronically via one or more telecommunication networks, e.g., an internal telecommunication network of the delivery organization, external telephone network, Internet etc. The telecommunications protocol may be e-mail, SMS, packet-switched data etc.

The branch office 2 may send an inquiry 4 to the customer for which one of the possible delivery addresses the customer wants to receive the package. This information may be sent, e.g., electronically via one or more telecommunication networks, e.g., a telephone network, Internet network etc. or another telecommunications network with adequate geographical and custom coverage. The telecommunications protocol may be e-mail, SMS, packet-switched data etc.

The customer 3 may reply to the inquiry, where after the actual package may be sent from the sorting office 1 to the branch post office 2 and from there to the customer's identified delivery address provided in the inquiry reply.

As an alternative, if client's reply 5 to the inquiry indicates that the client 3 is not close to his own branch post office 2, the delivery can be sent to another branch post office. Further, if the reply 5 indicates that the client is on holiday, the delivery may be delayed.

This dialog back and forth with the customer may require a multiple step inquiry/reply process; accordingly, the so called dynamic Dialogue Matrix (DDM, described above) may be used for managing that multistep dialogue.

In accordance with at least one disclosed embodiment, the sorting office 1 may begin delivery of the goods at time $t_1$ by all intermediate good delivery 8 to a branch post office 2 based on the general delivery address data like town or area. When the delivered goods arrive to the branch office 2, the system may make an end address inquiry 4 to the client's terminal 3 via telecommunications network.

The inquiry 4 can be made e.g. as a text message (e.g., SMS) where the client is allowed to select from multiple destination addressed $D_1$-$D_n$. The address information 7 relating to each customer is stored in the system. The inquiry 4 may be e.g. such a text message where the suitable end address $D_1$-$D_n$ can be selected as a single character (1, 2, 3, A, B, C . . . ) or single symbol (consisting of multiple characters) from the terminal 3's keyboard. In other words, the inquiry may be a multiple-choice inquiry. These addresses $D_1$-$D_n$ are stored in the delivery systems database and can be dynamically updated during inquiries, for example, allowing for the client one additional selection "none of the listed addresses" and inquiring the content of the new address in a new message which will be updated into the system's database. After reception of the delivery address information 5 the goods may be delivered to a selected, correct, end address from among the multiple end addresses $D_1$-$D_n$. The delivery of the goods may happen at time $t_3$.

The intelligence of the system is typically positioned in the main system $S_1$ or subsystem. $S_2$. Alternatively, in accordance with disclosed embodiments the delivery address inquiry 4 can be made also from the main delivery system $S_1$ and in this case the only address the system needs is the identity of the mobile terminal 3. In this case, $S_1$ sends the end address information via telecommunications network also to $S_2$ whereby the information delay of the prior art between $t_1$ and $t_2$ may be avoided almost completely.

The terminal 3 is typically a mobile phone but may be also be a palmtop or laptop computer or their equivalent.

The telecommunications protocol is typically SMS, but disclosed embodiments can be used also with other open or proprietary protocols like e-mail, push-email, chat messaging, app-push, etc.

The location of the mobile terminal can be also used as preliminary information of the client for determining where to deliver the goods to a correct delivery subsystem $S_2$ or even to a correct end address $D_1$-$D_n$. Thus, historical location information for the mobile terminal may be accessed in accordance with at least one embodiment to identify proximate delivery locations for the package based on where the customer has been located.

Additionally, known hotel bookings of a traveling customer (potentially known as a result of using the mediator to book such travel) can also be used as preliminary information or a flag to obtain information of the client for determining where to deliver a parcel. For example, a customer traveling between multiple cities on a tour of Europe may lose his/her passport and require a new one to be mailed. In such a situation, the delivery address and/or delivery date/time of the passport could be tied to known hotel bookings of the customer.

As explained above, the method and system according to the disclosed embodiments pertaining to delivery of goods and services may he implemented utilizing at least one computer, in a telecommunications network. For processing and managing inquiries 4 and corresponding replies 5, the so called dynamic dialogue matrix DDM may be utilized. Thus, client/customer replies may be managed in a manner that enables the mediator to manage and process multiple inquiries to the customer and match those inquiries with corresponding replies, even when the client is using SMS text messages, HTTP, or similar technology in which a reply does not automatically include an explicit reference to the inquiry. Thus, in accordance with at least this disclosed embodiment, an inquiry includes some kind of receiver's address or identification. In the SMS text message case that is may be the B subscriber's number. Alternatively, the sender's A subscriber's number or Calling Line Identity (CLI), or similar identification may also be attached to each text message.

Thus, in accordance with the disclosed embodiments, if a mediator service sends inquiries to a client and uses different A subscriber numbers in those different inquires, the mediator can differentiate between answers based on which number the client is sending replies to.

As a result, the mediator keeps track on inquires and answers. As a result, the mediator is able to find out whether the client has replied to a certain inquiry and what the answer was.

Additional security and/or reliability can be achieved using semantic analysis. In the matrix (see, for example, FIG. 7), there can be information about the inquiry and what kinds of answers are acceptable and/or appropriate. If an answer does not meet the criteria, it may be, for example, rejected or flagged for further clarification by the mediator. For example, if an inquiry asks the customer to indicate how many items are to be ordered, and the user answers "yes", then apparently the user did not know what the question was and the answer received by the mediator is not an authentic replay to the mediator's inquiry.

Additionally, semantic analysis can be used to improve the ability of the mediator to analyze a customer's responses and also to further query the customer for additional information so as to enable delivery of the customer's goods/services.

For example, presume that an individual Matt has ordered goods from an on-line store. Thus, he is expecting to receive a package with the goods via one of a number of delivery systems, regular mail, courier, etc. Thus, Matt receives a first message from the mediator, e.g., email, text message, etc., at his mobile phone indicating: "Matt, you have a package delivery from the postal service. Please select where you would like to receive your package: (1) your home address; (2) your work address; (3) a smart post location locker located at (Location A); (4) you would like to get more information about other delivery options.

Once Matt replies to the query message, for example, selecting option (3) a smart post location locker location at Location A, the mediator issues another message to Matt: "You selected Location A Smart post. We will send you a delivery confirmation message with instructions when the package is there."

Sometime later, the package arrives at Location A and the mediator issues the delivery confirmation message to Matt: "Your package has been delivered to Location A. Please reply with the letter (a) to this message when you arc at the location. If you need instructions on how to travel to Location A, please reply with the letter (i)."

Once Matt has arrived at Location A, he receives further instructions allowing him access to his package: "Your postal locker is 69 and your temporary access code is 8374. This code is valid for today only." As another alternative, the user may be provided with visual indicators at Location which act as personalized way-finding signage to aid in his locating the postal locker, e.g., different beams of lights, a path of icons, such as roses, white stars, etc. to assist the customer, displaying an icon, graphic, name, or color pattern that is unique to the customer to assist him in locating the locker.

Alternatively, Global Positioning Service (GPS) could be used to determine Matt's location and guide him to and/or within the Location A to get to the postal locker.

Optionally, the lock for the postal locker may be conditional upon payment of a processing fee or other terms and conditions. Thus, for example, when Matt enters the access code, he receives another message from the mediator requesting authorization of a payment of a service fee to obtain the package. Payment of this fee may be made using any one of a number of conventionally available mobile payment services or, alternatively, Matt may be provided with an option to pay with a voucher that may be obtained at Location A from personnel or an automated vending machine.

Based on Matt's successful package deliver and further deliveries for Matt and/or others, the mediator may learn what message content, instructions, delivery options and terms and conditions are most effective for delivery of the package and/or payment of the service fee or compliance with terms and conditions. For example, based on repeated use of this service by Matt, the mediator is able to determine the most likely selection of delivery options, e.g., location, etc. that Matt will pick. As a result, the mediator is able to offer that combination of delivery options to Matt as a default when soliciting delivery options for a next package. This type of learning analysis by the mediator enables mediator to analyze and anticipate individual needs: the mediator determines what has been the previous selected locations by the end user and is able to provide delivery options based on previously selected locations. It should be understood also that the mediator may be able to formulate delivery options based not only on a specific delivery service but on other products/services obtained by the customer using the mediator.

Likewise, the mediator is able to offer improved combinations of delivery options to other customers for their packages based on a collection of delivery options selected and used by a plurality of customers including Matt. For example, if no individual user information is available for Jennifer, the mediator may interpolate such information based on cluster analysis of individuals similar to Jennifer. Accordingly, if Matt and Jennifer have similar characteristics, e.g., it is known that they both study at a particular university and live in a particular dormitory. This type of collective learning analysis by the mediator enables the mediator to anticipate individual needs for whom this service has yet been provided For example: Demographic (user individually, or typical user of the service collectively), time and date (time, weekend, holiday) location or other attributes.

Moreover, by collecting and analyzing previously sent mediator queries and user responses, the mediator is able to better understand what the user is saying when he/she responds to a query in a specific way. Thus, by analyzing the syntax and context of user responses, the mediator is able to offer products/services in a manner that is more user-friendly and understandable. Thus, even if a product/service provider's automated (or semi-automated) system is not particularly user friendly, the mediator is able to improve the user experience by overlaying a level of syntax based intelligence on top of the system to assist both the customer and the product/service provider's system.

For example, conventionally, a user may respond to an inquiry from an automated system hut make a small error in the response; however, that small error is not understandable by the automated system and is, therefore, misinterpreted or completely ignored.

The mediator according to the disclosed embodiments enables the product/service provider's system to better "understand" user responses. Thus, when a query message from the mediator instructs the user to reply (1) for yes and (2) for no. The mediator is able to consider or understand that the user's response of "yes," "yeah," or "ok," is meant by the user to indicate a response with (1). Depending on the options selected by the mediator and/or service provider, receipt of such a response at the mediator may trigger the mediator to send another message to the customer asking them to confirm their affirmation to the question. Alternatively, the product/service provider may simply accept that the message is an affirmation even though the customer did not specifically follow directions in the query message. It should be noted that this ability to accept user responses that are not fully responsive to the query message is unique to the disclosed embodiments and is quite different from conventional automated system options. This is because conventional systems may need to rely entirely on direct correspondence between query instructions and user responses as their only mechanism (or one of their only mechanism) for security and ensuring that a specific response has been sent in response to a specific query.

Thus, because the disclosed embodiments have the ability to send a query to a user and have an associated response be sent to a unique reply address (or unique within a set of available reply addresses), the disclosed embodiments have the unique opportunity to intelligently consider whether a user's response involves user errors such as spelling errors or the user's misunderstanding of a query message.

Moreover, because the mediator receives and analyzes so many user responses, the mediator is able to identify correlations between various query content, anticipated user responses and unanticipated user responses that include synonyms, user typographical errors or unanticipated responses that can be understood by the mediator once the errors are identified.

For example, when the mediator is serving as a front end system for an airline check-in, the mediator may be programmed to identify proper names in ordinarily non-understandable responses. Thus, when the mediator is used to check-in a traveler and the mediator sends a query message regarding seat selection to the traveler, the mediator may receive a response from the user "I want to sit next to Mr. McCarthy." However, the mediator's query message was simply asking about whether selection of a particular aisle seat was acceptable (thereby requiring a yes (1) or no (2) response).

In such a situation, the user's response could be identified as potentially unresponsive to the mediator's query and one of various subsequent actions could be taken: (1) the mediator could resend the message with an addendum asking whether the user would like to be connected to an airline representative via a voice call, chat or messaging; or (2) the mediator could identify the proper name "McCarthy" and speculate that the user has a request regarding another passenger, thereby sending a follow up query to the user regarding further information or asking whether the user would like to be connected to an airline representative via a voice call, chat or messaging.

The mediator made include a tutorial module that is able to formulate a list of potential options (either, clarification options if a previous response is not what was an expected user's response from a previous query from the mediator or sample options to the user with an inquiry so that the user is informed of what an appropriate response to the mediator's query would be.

Figure 10:
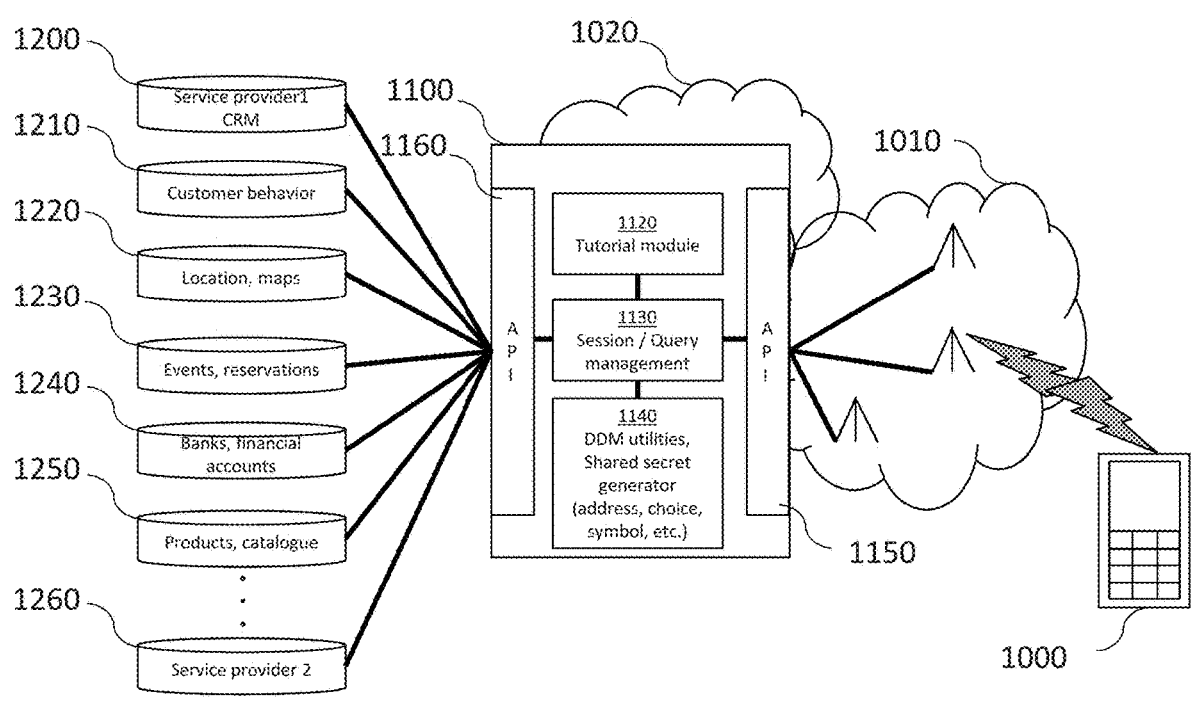
FIG. 10 schematically illustrates the mediator according to a disclosed embodiment.

Now referring to FIG. 10 the user's mobile phone 1000 is connected to the mediator 1100 via at least one communications network 1010, 1020. The mobile phone 1000 can be any type of hand-held mobile communication device capable of communicating with 2G, 3G, 4G or similar networks 1010, 1020.

According to an embodiment, the mediator 1100 may comprise several modules and instances as well as interfaces both towards the end users and service provider systems. Within the described embodiment, the mediator 1100 may contain a tutorial module 1120 in connection with a session/query management module 1130. The session/query management module 1130 may manage each message sent to end users as well as received replies from the end users. Furthermore, the session/query management module 1130 keeps track of the status of each on-going sessions with every end user. According to an embodiment, the mediator 1100 may also comprise several supporting modules 1140, e.g., utilities, shared secret generation (addresses, choice, symbol, etc.), relevant instances needed for the process management. According to an embodiment, the mediator 1100 may also have an interface module 1150 to different communications networks and another interface module 1160 to various databases held by the different service providers, authorities, banks, institutions, etc.

According to an embodiment, the databases (1200, 1210, 1220, 1230, 1240, 1250, 1260) may contain various, different types of information pertaining to an end user himself/herself, service or product ordered by the end user; additional services related to the ordered service(s) or product(s), location information or maps relating to the service, payment options for the ordered services/products and additional services/products, event and reservation support information, product information and service/product catalog information, and/or various other information as may be relevant for service(s)/product(s).

The tutorial module may access a database initially populated based on a set of queries and sample appropriate responses. Subsequently, in accordance with at least one embodiment, the database may be further populated based on responses received to various queries so that the tutorial module learns as it works. It should be appreciated that the potential for learning and improving analysis of user responses may be quite high considering that the mediator may be querying and analyzing tens of millions of user responses every year.

In accordance with at least one embodiment, messages sent to a client/customer may include at least "one way-finding cue" for the client/customer to locate a delivered parcel or item for pick up. Such a message may be particularly helpful to a postal delivery customer or carrier.

As a result, at least one disclosed embodiment of the mediator may provide functionality that may assist the customer to find the location from which to pick up the delivered parcel. For example, the parcel could be stored in a locker and the mediator could direct the customer to the correct locker. The cue could be given in one of many ways. The cue could be provided in the form of an indoor map image sent to the mobile phone in a message. Optionally, the message may be produced by an application (either a mobile application resident on the device or an application running on a server available via a network, e.g., the Internet) that updates the map and showing the customer's current location and the location of the parcel. In this regard, the message may be utilized by that application. Alternatively, the cue may be an arrow in the direction of the parcel and the distance to travel and that arrow could appear either on the phone, in the user's glasses, or on a actual sign which "recognizes" the approach of the customer and directs him or her accordingly.

In accordance with at least one embodiment, at least one way-finding cue interfaces with any location-based information system including but not limited to GPS, cell tower triangulation, or RFID tracking.

In order for the mediator to provide the customer with the right way-finding cues at the right time, the mediator needs to know where the customer is at any given point in time. All the technologies listed are capable of being used to specific a user's location. There may be other technologies available, but these are the ones that come to mind.

In accordance with at least one embodiment, messages may be sent to one or more of any number of devices associated with a client/customer (including an individual and/or individuals within a client organization. Thus, for example, a client/customer's device is one of a mobile device, a user interface within a transport vehicles, or environmentally-embedded micro-controllers.

Therefore, it should be understood that disclosed embodiments may be utilized in an environment of ubiquitous, pervasive computing whereby sensors, actuators, micro-controllers, are increasingly embedded not only in computers and personal devices, but also in the fabric and woodwork of the physical environment. Accordingly, systems may be configured to communicate with one another in a like fashion. Thus, disclosed embodiments of the mediator may have a significant role and affect because distributed computational capacity cannot amount to much without providing contextual awareness to automated or semi-automated communication with humans.

For example, as an example of an individual picking up a parcel ordered online, a user may want/need to pick that parcel up at a retail location such as a shopping mall. In accordance with at least one disclosed embodiment, the mediator could direct the user to the correct store via messaging without the user having to do any typing or searching. This could be enabled by the mediator receiving information indicating the user's location via GPS sensors and software provided in the user's mobile device. Thus, when the user arrives at the mall, the user may receive a message(s) sent by the mediator indicating, for example, on which side of the mall to park, which door/entrance to enter, which floor to approach. Additionally, optionally, signs, floor tiles, etc. at the location may be embedded with LED's may be controlled to be activated and/or output information upon the approach of the user's mobile device so as to direct the user to the parcel location.

In accordance with the at least one disclosed embodiment, it is possible that the service provider is actually a mediator and the "actual" service provider is somewhere else. In other words, the organization or entity that is providing the service and/or product is not the same organization that is communicating with the customer/client. In that case, only the mediator (i.e., the organization communicating with the client/customer) needs to have the matrix-based system; thus, the actual service/product provider may communicate with the mediator using either the mediator's matrix-system or other secure means like a crypto-channel.

For example, a car sharing system could be implemented in the following way: cars are dispersed around a city. When a user needs a car, he or she sends a message to a mediator to request the car or ask where the nearest car is. The mediator communicates with the user, e.g., to identify the car or its location. That reply comes from a random address y'. When the user meets up with the car, a message may be sent to the mediator indicating that the service period should begin, e.g., asking the mediator to remotely release the car's locks if the service is a rental car service, indicating to the mediator which car and driver has actually picked up the user if the service is a car service, etc. Messages such as this may be relatively reliable, because they may be sent to the address that the only the user and mediator know. The communication between mediator and the car or car service is similarly invisible to the user and provides additional security for the service/product provider.

In accordance with at least one embodiment, the at least one way-finding cue interfaces with any location-based information system including but not limited to GPS, cell tower triangulation, or RFID tracking.

In accordance with at least one embodiment, postal customer's device is one of a mobile device, a user interface within a transport vehicles, or environmentally-embedded micro-controllers.

In accordance with at least one embodiment, a mediator can communicate with a postal customer and a postal service, wherein the mediator can establish a two-way dialogue with a device of the postal customer to facilitate convenient and secure pickup or delivery of a parcel. Yet in accordance with at least one embodiment, the dialogue includes sending messages to and receiving messages from the postal customer's device and the messages including:
  at least one message that facilitates obtaining parcel routing information for the postal service by affirming with the postal customer where the parcel should be picked-up or delivered;
  at least one message that alerts and/or confirms to the postal customer the parcel's pickup or delivery time at the specified location; and
  at least one message to the postal customer that specifies a dynamically assigned access code, password, or key which to be used by the postal customer to retrieve the parcel at the specified location,
wherein each message includes a session identifier comprising at least one of a reply address, a destination address, and reply options, reply symbols, or reply choices, wherein the session identifier is common to a plurality of messages within the same dialogue if the plurality of messages share the same context.

In accordance with at least one embodiment, the context means the actual subject matter of the whole communication. Thus, a plurality of messages can share the same context but at the same time all the individual messages can be identified and separated from each other.

In accordance with at least one embodiment, the mobile phone number can be used as a universal address. In other words the embodiment allows the user to use a telephone number as a dynamic mailing address. In a first use case example, Matt wants to send a package to Jennifer but he does not know or remember Jennifer's address; or he does not know at which of her many addresses she wants to receive the package. Instead of a conventional practice, in which the address information, e.g., recipient name, address, zip code, state, country, etc. are provided, Matt writes only Jennifer's mobile phone address (number) e.g.: "to: 0400876444". This may contain optional information such as name for verification purposes. This may also contain other optional information such as the identifier of the sender of the package, e.g.: "from: 0400312311" (which is Matt's mobile phone address (number).

When the post office receives the package they use a mediator. The mediator sends a notification to Jennifer's mobile phone, i.e.: 0400876444. The notification may be by following: "Postal services would like to deliver you a package. Please reply to this message with your name, address, zip code etc.". After Jennifer's reply is received by the mediator, the package gets sent to the dynamic address that was provided by the recipient as a destination address.

In a second use case example, the sending phase may he the same as in the first use case hut the recipient has already previously entered an address or multiple addresses. This may have been done in one of several ways, e.g., the end user has entered the addresses in a web-from or the system (mediator) has learned the information from previous uses. In the second use case, the notification message sent to the recipient may be, for example: "Postal services would like to deliver you a package. Please reply to this message with the number next to a delivery address:

1) address one: (optional nickname: home) Jukka Salonen, Lampitie 57, 01810 Luhtajoki
2) address two: (optional nickname: work) Jukka Salonen, Elimäenkatu 17-19, 00510 Helsinki
3) address three: (optional nickname: summer place) Jukka Salonen, summer place, Turku
4) other please enter name, address, zip code, etc."

In the first and second use case examples, it is also possible that the sender can be charged with his mobile. In this case the mobile phone number is also a dynamic account number. There are presented several suitable mobile charging methods in a U.S. patent application Ser. No. 13/452,229, filed Apr. 20, 2012, now U.S. Pat. No. 8,737,958; in a U.S. patent application Ser. No. 13/452,311, filed Apr. 20, 2012, now U.S. Pat. No. 8,737,954; in a U.S. patent application Ser. No. 13/529,737, filed Jun. 21, 2012, now U.S. Pat. No. 8,737,955; in a U.S. patent application Ser. No. 13/529,776, filed Jun. 21, 2012, now U.S. Pat. No. 8,737,959; in a U.S. patent application Ser. No. 14/264,100, filed Apr. 29, 2014; and in a U.S. patent application Ser. No. 14/264,207, filed Apr. 29, 2014, the disclosures of which are incorporated herein by reference in their entirety.

In a third use case example, an extra service fee may be collected from the recipient for a special delivery. In the third use case, the notification message may be, for example: "Postal services: There is a postal package delivery to you to location x, Please press A if you want to change the delivery address".

The recipient replies: "A".

The dialogue continues by following: "Please select:

1) address one: (optional nickname: home) Jukka Salonen, Lampitie 57, 01810 Luhtajoki
2) address two: (optional nickname: work) Jukka Salonen, Elimäenkatu 17-19, 00510 Helsinki
3) address three: (optional nickname: summer place) Jukka Salonen, summer place, Turku
4) other please enter name, address, zip code etc."

The recipient replies: "3".

The dialogue continues by following: "You selected summer place Jukka Salonen, summer place, Turku. The service charge for the dynamic address change is USD 8. Please press A to accept the charge."

The recipient accepts the address change and charge and replies: "A".

The payment may continue if there is a payment method already registered to the mobile number. The system (mediator) may send a notification: "Thank you. Your package will be delivered . . . ". If there are not any payment methods registered, the system (mediator) may send a notification message, e.g.: "Please press this link to register your payment method." The link would then lead to a payment registration page or form at a web-site and finally to procedures for an actual payment process.

In a fourth use case example, the sender wants to send a package to a recipient but the sender does not remember recipient's address and the sender does not know how much it will cost to send the package. This may be a post office or a "drop the package" automat. The sender may write: "from: 0400312311 (optional); to: 0400876444 (may contain optional information such as name for verification purposes)". When the post office receives the package, they use a mediator to start a dialogue with the recipient:

"Postal services would like to deliver you a package. Please reply to this message with your name, address, zip code etc."

The recipient will reply and deliver his/her address: "Jennifer, Honolulu, Hawaii".

When the post office has received recipient's address they will start a dialogue to the sender: "You are about to send a postal package to 0400876444 (optional: Jennifer, Honolulu, Hawaii). Please reply A to accept USD 30 for the delivery charge."

If the sender replies "A," the sender will be charged as described above and the package will be delivered to the recipient.

The recipients and senders in the third and fourth example use cases can be charged like wisely as presented in the first and second use case examples.

Although disclosed embodiments have been described in considerable detail with reference to certain exemplary versions thereof, other versions are possible. Therefore, the spirit and scope of the appended claims should not be limited to the illustrated versions herein.

I claim:

1. A network server that communicates with a postal customer via their mobile terminal and with a postal service server, wherein the network server establishes a two-way dialogue with the mobile terminal of the postal customer to facilitate convenient and secure pickup or delivery of a parcel, wherein the dialogue includes sending text messages to and receiving text messages from the postal customer's mobile terminal, the text messages including at least one text message to the postal customer that:

facilitates obtaining parcel routing information for the postal service by affirming with the postal customer where the parcel should be picked-up or delivered; or alerts and/or confirms to the postal customer the parcel's pickup or delivery time; or specifies a dynamically assigned access code, password, or key which to be used by the postal customer to retrieve the parcel at the specified location, wherein each text message includes a unique session identifier comprising at least one of the following:

a unique reply address that is different from other text messages in the same dialogue, a unique destination address that is different from other text messages in the same dialogue, and/or unique reply options, reply symbols, or reply choices which differ from other text messages in the same dialogue, and wherein postal customer replies are matched up with the text message to which they respectively correspond based on the network server's analysis of the unique identifier.

2. The network server of claim 1, wherein the text messages further comprise at least one text message that provides at least one way-finding cue for the postal customer to locate the delivered parcel.

3. The network server of claim 2, wherein the at least one way-finding cue is an arrow pointing in the direction that the postal customer should travel to a location of the delivered parcel.

4. The network server of claim 2, wherein the mobile terminal is a wearable mobile device such as watch, bracelet, glasses, contact lens, glove, or other clothing that displays the at least one way finding cue.

5. The network server of claim 2, wherein the mobile terminal is a vehicle interface that displays the at least one way-finding cue.

6. The network server of claim 2, wherein the at least one way-finding cue interfaces with a location-based information system including at least one of GPS, cell tower triangulation, or RFID tracking.

7. The network server of claim 1, wherein the postal customer's mobile terminal is one of a mobile device, a user interface within a transport vehicle, or one or more environmentally-embedded micro-controllers.

8. The network server of claim 1, wherein the text messages further comprise at least one text message that specifies a choice of payment options for delivery of the parcel to the postal customer.

9. The network server of claim 1, wherein the text messages further comprise at least one text message that confirms verification and acceptance of purchase and/or payment details including but not limited to payment amount, payment account identifiers, payment type, transaction terms and at least one item being included in the parcel.

10. The network server of claim 1, wherein the text messages further comprise at least one text message that includes instructions for accessing the delivered parcel in a postal delivery box.

11. The network server of claim 10, wherein the text messages further comprise at least one text message that identifies a postal delivery box number and a temporary access code, password, voice-spoken key, gestural key, biometric key, or other form of key.

12. The network server of claim 10, wherein the text messages further comprise at least one text message sent to the postal customer that includes information indicating visual indicators associated with the postal delivery box including the package.

13. The network server of claim 1, wherein the postal customer replies are matched up with the text message to which they replied based also on a client identifier address of the postal customer's mobile terminal to which the text messages have been sent.

14. The network server of claim 13, wherein, for each sent text message sent from the network server, the network server stores at least two pieces of information selected from: the content of the text message, the reply address for the text message and the client identifier address to which the text message was sent.

15. The network server of claim 13, wherein, for each received reply from the client identifier address, the network server stores at least the reply address to which the response text message was sent or the content of the text message, and the network server determines the sent text message to which each received response text message is a reply to based on the stored information.

16. The network server of claim 1, wherein the network server also communicates with the postal service to determine the postal customer's selected delivery location and determine when the package has been delivered at the selected delivery location.

17. The network server of claim 1, wherein the server also communicates with the parcel service or other service to determine the selected pick-up location and when the parcel has been scheduled for pickup at the selected pickup location.

18. The network server of claim 1, wherein, for each sent text message sent from the network server, the network server stores at least two pieces of information selected from: the content of the text message, the reply address for the text message and the client identifier address to which the text message was sent.

19. The network server of claim 1, wherein text messages sent by the network server are sent with one of a plurality of distinct reply addresses.

20. The network server of claim 1, wherein replies to the text messages sent by the network server do not include any field which includes explicit reference to the sent text message to which it responds.

21. The network server of claim 1, wherein reply options that are specified in the body of a sent text message consist of a single alphanumeric character.

22. The network server of claim 1, wherein the reply options that are specified in the body of the sent text message consist of multiple-characters that can be interpreted as a single symbol or option.

23. The network server in claim 1, wherein the reply options that are specified in the body are free-form replies that are interpreted through semantic analysis.

24. The network server of claim 23, wherein the reply specified is 'y' and 'n'.

25. The network server of claim 23, wherein the reply specified includes selecting and alphanumeric character in a sequence of consecutive alphanumeric characters such as a, b, c.

26. The network server of claim 23, wherein the reply specified is "yes" or "no.".

27. The network server of claim 23, wherein the reply is interpreted by the network server through semantic analysis to correspond to specified user selections.

28. The network server of claim 1, wherein the network server determines a response text message to any text message as an unanticipated response text message if the reply text message includes a reply that is not one of the delivery options specified.

29. The network server of claim 28, wherein the network server sends a follow up text message to the postal customer requesting clarification of the postal customer's reply text message if the network server determines that the reply text message was an unanticipated reply.

30. The network server of claim 29, wherein the follow up text message includes an additional option of communicating with personnel to provide clarification of the previous response text message.

31. A network server configured to communicate with a postal customer via their mobile terminal and with a postal service server, wherein the network server establishes a two-way dialogue with the mobile terminal of the postal customer to facilitate convenient and secure pickup or delivery of a parcel,
   wherein the dialogue includes sending text messages to and receiving text messages from the postal customer's mobile terminal, the text messages including:
   at least one text message that facilitates obtaining parcel routing information for the postal service by affirming with the postal customer where the parcel should be picked-up or delivered;
   at least one text message that alerts and/or confirms to the postal customer the specified location; and at least one text message to the postal customer that specifies a dynamically assigned access code, password, or key which to be used by the postal customer to retrieve the parcel at the specified location,
   wherein each text message includes a session identifier comprising at least one of a reply address, a destination address, and reply options, reply symbols, or reply choices, wherein the session identifier is common to a plurality of text messages within the same dialogue if the plurality of text messages share the same context.

* * * * *